(12) United States Patent
Tada et al.

(10) Patent No.: US 6,597,783 B1
(45) Date of Patent: Jul. 22, 2003

(54) SYSTEM AND METHOD FOR STORING, ROUTING, AND TRACKING DIGITAL DOCUMENTS IN A CALL CENTER

(75) Inventors: Mark David Tada, Redwood City, CA (US); Hung Thanh Nguyen, Saratoga, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/490,570

(22) Filed: Feb. 1, 2000

(51) Int. Cl.$^7$ ................................................. H04M 3/00
(52) U.S. Cl. ............................... 379/265.09; 379/100.01
(58) Field of Search ..................... 379/100.01, 100.05, 379/100.06, 100.09, 265.01, 265.09, 265.11, 265.12, 266.05, 266.1; 358/407

(56) References Cited

U.S. PATENT DOCUMENTS

| 6,021,428 | A | * | 2/2000 | Miloslavsky | ................ | 709/206 |
| 6,167,395 | A | * | 12/2000 | Beck et al. | ..................... | 707/3 |
| 6,212,178 | B1 | * | 4/2001 | Beck et al. | ................. | 370/352 |
| 6,356,633 | B1 | * | 3/2002 | Armstrong | ............. | 379/265.11 |

OTHER PUBLICATIONS

Mike Fratto, "Automated Fax Routing," Network Computing, Nov. 15, 1998, pp. 138, 140, and 141.

* cited by examiner

Primary Examiner—Ahmad F. Matar
Assistant Examiner—Quynh Nguyen
(74) Attorney, Agent, or Firm—Chapin & Huang, L.L.C.; David E. Huang, Esq.

(57) ABSTRACT

Disclosed is a system and method for tracking, routing, and storing a number of digital documents in a call center. An example of an embodiment of the system includes a customer contact management server that is part of a network in a call center. The customer contact management server includes a processor coupled to a local interface and a memory coupled to the local interface. Stored on the memory is document tracking logic that is executed by the processor to perform the functions of tracking, routing and storing the digital documents. In one embodiment, the document tracking logic comprises contact management logic to generate a contact record associated with a digital document and to store the contact record on a contact database. The document tracking logic also includes resource management logic to identify a routing designation on the digital document, and scheduling logic to transmit the digital document to a destination based upon the routing designation.

23 Claims, 6 Drawing Sheets

SYSTEM AND METHOD FOR STORING, ROUTING, AND TRACKING DIGITAL DOCUMENTS IN A CALL CENTER

TECHNICAL FIELD

The present invention is generally related to the fields of data communications and customer contact management, and, more particularly, is related to a system and method for storing, routing, and tracking digitally encoded (digital) documents in a call center.

BACKGROUND OF THE INVENTION

Many companies, governmental agencies, and other organizations provide various support functions relative to their activities. For example, companies typically sell products or services to consumers or other entities that require continued support by a company to facilitate the effective use of the product or service by the consumer. Likewise, governmental agencies or other similar organizations may have to provide instructions to citizens who seek to satisfy their obligations to the organizations. These support functions often result in a centralized or distributed support organization that can be contacted by consumers who seek help with regard to the product or service in question.

These centralized and distributed support organizations may often be established as a call center. A call center may include a number of agents who are linked via a private telephone network or private exchange that will handle multiple calls from various consumers and answer questions and provide service and support. Typically, these agents record the nature and substance of their activities with regard to individual consumers to create a record of the exchange for legal purposes and for other reasons.

In addition, data processing systems and computer networks are employed in call centers to aid in the exchanges between the agents and the consumers. For example, there is a desire in many call centers that the same agent handle repeated calls by the same consumer so that the agent can most efficiently handle a problem since the agents is aware of the call history. Such processing systems and computer networks facilitate maintenance of a record of all calls from a particular consumer on the database, for example, so that those records can be easily recalled and examined by the agent in question or can be examined by new agent who can then be appraised of a particular ongoing crisis or problem. The data processing systems and computer networks may also facilitate displaying the records of a particular consumer on a screen of an agent that deals with the particular consumer.

Call centers have also embraced the use of electronic mail and other forms of data communication such as facsimile machines, etc., that provide multiple means of communication between the consumer and the agent to achieve the support functions of the call center. In particular, such communication media provide a significant advantage in that an agent may be provided with documents and the like from a consumer relative to a problem to be resolved. However, the use of these multiple means of communication has saddled call centers with the problem of ensuring that electronic mail messages, facsimiles, and other documents in electronic form or hardcopy are routed to the proper agent in the call center in association with a particular consumer concern, etc.

In particular, currently it is possible that documents received by facsimile, for example, may not reach the appropriate agent at all. For example, facsimile messages received via facsimile machines that are employed by multiple agents may be lost or physically routed to the wrong agent. Electronic mail messages may arrive at a call center with no indication as to the particular agent to whom it should be routed.

It is desirable that all communication from a consumer to an agent whether it be a facsimile, electronic mail, or otherwise be routed to the proper agent quickly and efficiently. This is to ensure that all consumer concerns are addressed quickly so that consumers are not discouraged from obtaining the needed service and support because of an unnecessarily prolonged experience due to lost documents, etc.

SUMMARY OF THE INVENTION

In light of the foregoing, the present invention entails a system and method for tracking, routing, and storing a number of digital documents in a call center. In one embodiment, the system includes a customer contact management server that is part of a network in a call center. The customer contact management server includes a processor coupled to a local interface and a memory coupled to the local interface. Stored on the memory is document tracking logic that is executed by the processor to perform the functions of tracking, routing and storing the digital documents. In one embodiment, the document tracking logic comprises contact management logic to generate a contact record associated with a digital document and to store the contact record on a contact database. The document tracking logic also includes resource management logic to identify a routing designation on the digital document, and scheduling logic to transmit the digital document to a destination based upon the routing designation.

The present invention may also be viewed as a method for tracking and routing a number of digital documents in a call center, comprising the steps of: generating a contact record associated with a digital document and storing the contact record on a contact database; identifying a routing designation on the digital document; and transmitting the digital document to a destination based upon the routing designation.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
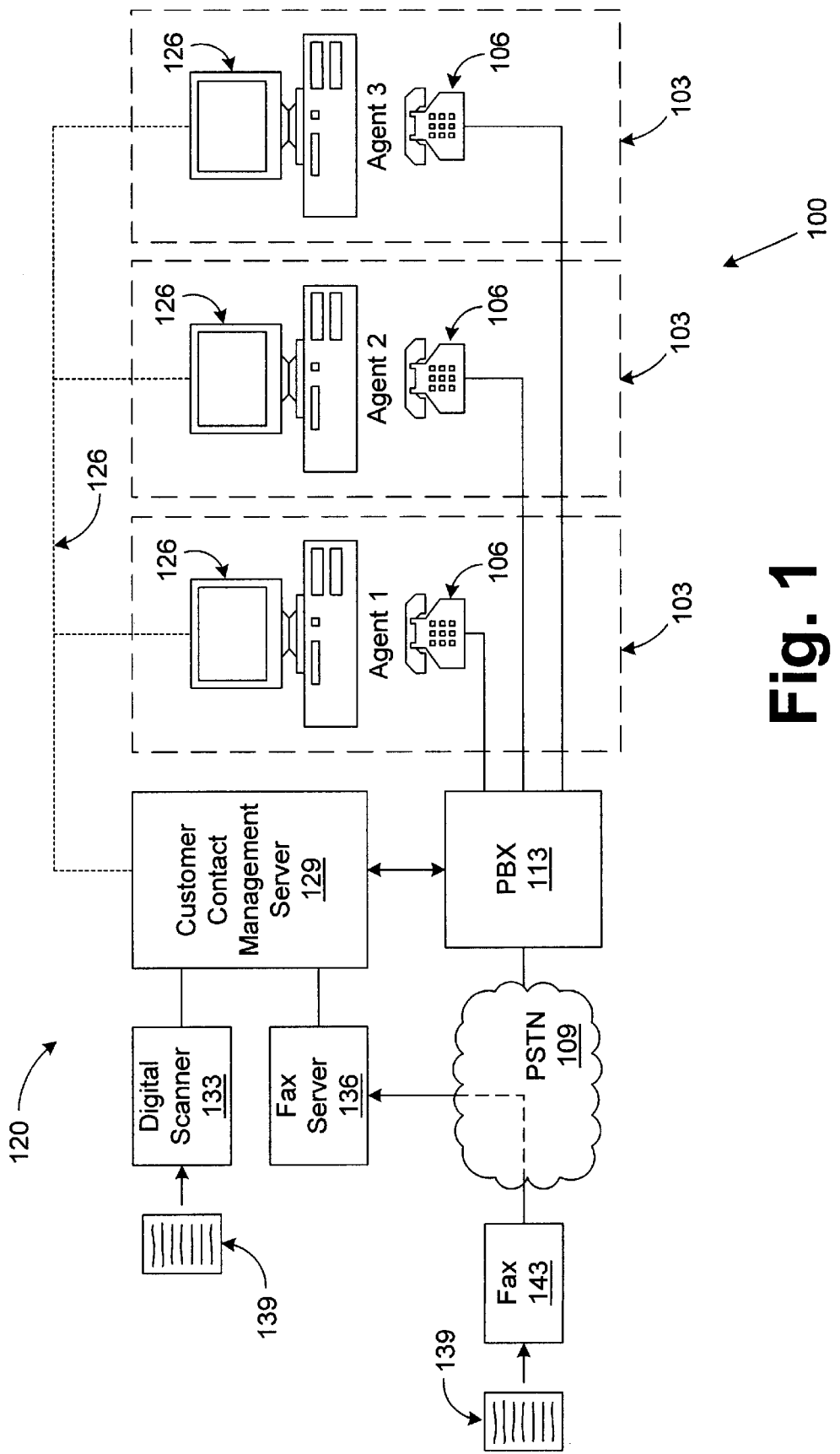
FIG. 1 is an architectural block diagram of a customer call center including a digital document system according to an embodiment of the present invention.

With reference to FIG. 1, shown is an example of a customer call center 100 that performs the function of receiving a number of telephone calls and other contacts to provide customer support, information, or other similar purpose. Generally, the customer call center includes a number of agents that answer the telephone calls by the customers and generally interact receiving documents, or other information in pursuit of addressing the concerns of the customer caller. The agents are housed in a number of offices 103 and handle telephone conversations via telephones 106 that are coupled to the public switched telephone network ("PSTN") 109 via a private exchange ("PBX") 113. There may be any number of agents in a call center 100.

The customer call center 100 also includes a digital document distribution and tracking system ("digital document system") 120 according to an embodiment of the present invention. The digital document system 120 includes a local area network 123 that links a number of computers 126 associated with each of the agents with a customer contact management ("CCM") server 129. Also linked to the CCM server 129 is a digital scanner 133 and a facsimile server 136. The digital scanner 133 is used to scan paper documents 139, thereby creating a digital document that is transmitted to the CCM server 129.

In addition, the facsimile server 136 is coupled to a transmitting facsimile 143 via the PSTN 109. The paper document 139 may be transformed into a digital document using the transmitting facsimile 143 that is ultimately received by the facsimile server 136 which forwards the digital document to the CCM server 129. Digital documents may also be received by the CCM server 129 via a wide area network such as the Internet or other similar network that interfaces with the CCM server 129.

The CCM server 129 advantageously determines where the received digital document is to be transmitted within the call center 100. The CCM server 129 also stores the digital document along with related information and tracks the location of the received digital documents throughout the digital document system 120. The CCM server 129 also provides statistical information relevant to the digital document as will be discussed. In this manner digital documents received by the call center 100 are not lost or misplaced.

Figure 2:
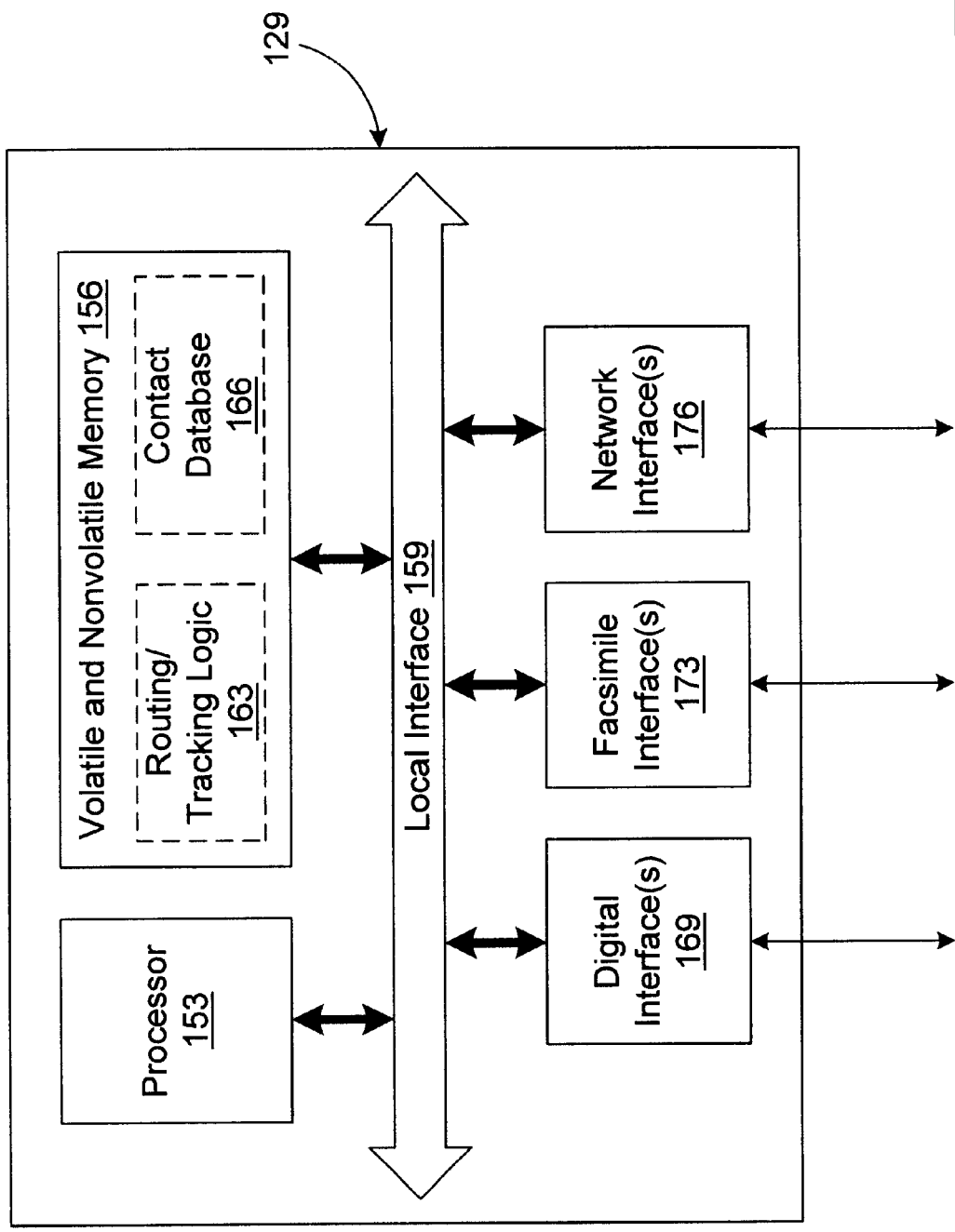
FIG. 2 is an architectural block diagram of a customer contact management server included in the digital document system of FIG. 1.

Turning then, to FIG. 2, a block diagram of the CCM server 129 is shown. The CCM server 129 includes a processor 153 and volatile/nonvolatile memory ("memory") 156 that are both linked by a local interface 159. The memory 156 may include, for example, a random access memory (RAM), read only memory (ROM), hard disk drives, compact disks/drives, floppy disks/drives, magnetic tapes/drives, or other suitable devices. Non-volatile memory is that which maintains data during a loss of power such as a ROM, whereas volatile memory does not maintain data through loss of power such as with RAM. The local interface 159 may include, for example, a data bus and a control bus to manipulate the flow of data as is generally known in the art.

The CCM server 129 also includes routing/tracking logic 163 that is stored on the memory 156 and executed by the processor 153. Also stored on the memory 156 is contact database 166 in which information is stored and accessed pursuant to the routing/tracking logic 163. The CCM server 129 also includes a digital interface 169, a facsimile interface 173, and a network interface 176. The digital interface 169 and the facsimile interface 173 both make the digital documents received from the scanner 133 and the fax server 136, respectively, available on the local interface 159. Likewise, the network interface(s) 176 allow the CCM server 129 to communicate with other equipment linked to the local area network 123 such as the computers 126 (FIG. 1).

Figure 3:
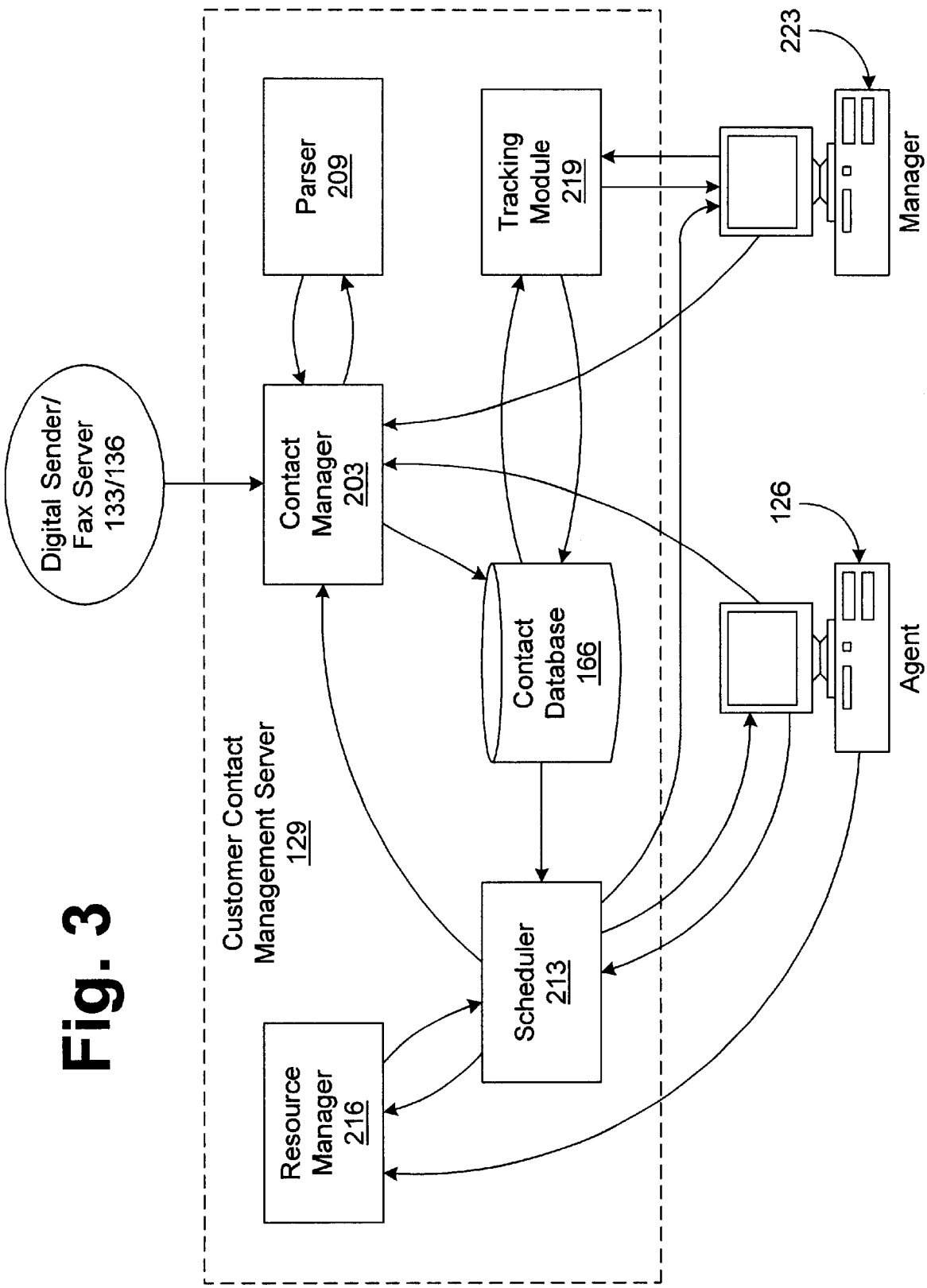
FIG. 3 is a functional block diagram of the customer contact management server of FIG. 1 showing a number of logical components contained therein.

With reference then, to FIG. 3, shown is a functional block diagram of the CCM server 129 according to an embodiment of the present invention. The functional block diagram of the CCM server 129 provides an illustration of the pertinent logical and physical components contained therein. The facsimile server/scanner 133/136 each may provide a digital document that is received by the CCM server 129. Within the CCM server 129, a contact manager 203 generates a contact record that is stored on the contact database 166. The contact record includes a number of fields that contain pertinent information about the digital document. Upon creating the contact record, the contact manager 203 includes information such as the time and date a digital document was received, the nature of the digital document, i.e. whether it was a fax or scanned hardcopy, the telephone number of the facsimile that sent the information, etc. The digital document is also stored along with information that relates the digital document to the appropriate contact record created on its behalf.

The fields of the contact record may include, for example, but are not limited to, customer name, address, telephone number, facsimile number, direct-inward-dialing (DID) number, time, date, location of document, name of agent to whom the document is addressed (routing designation) and other pertinent fields. The contact record is the device employed to track the location and manipulation of the digital document. This information prevents a digital document from being lost or misplaced.

In the case of the digital documents from the scanner 133 and the facsimile server 136, the information contained thereon is generally not recognizable by the contact manager 203. Consequently, the contact manager 203 applies the digital document to the parser 209 that examines the digital document to identify the information contained therein. In cases where the digital document contains recognizable digital text, the contact manager 203 may be configured to simply identify the pertinent information therein and place such information in the appropriate fields of the contact record. Perhaps the most pertinent field to identify is a routing destination that indicates the agent, individual, or department in the call center to whom the digital document should be sent.

The parser 209 may include various devices such as character recognition routines and other logical components that allow the recognition of text, etc. on the face of the digital document. The parser 209 identifies various information from the recognized text that is placed in one or more of the various fields of the corresponding contact record. The parser 209 may do this, for example, by identifying key words or identifiers in the digital document such as "To" or "From" or other like language that is followed by pertinent information to be placed in the fields of the contact record. Also, the parser 209 may examine the formatting of the digital document or look for specially formatted sections such as addresses, etc., to identify information for the associated contact record. Once again, the routing destination is particularly desired so that the digital document is transferred to the appropriate person or department. Once either the contact manager 203 and/or the parser 209 have finished processing the digital document as above, the digital document is saved and the corresponding contact record is saved in the contact database 166.

The CCM server 129 includes a scheduler 213 that continually examines the contact records in the contact database 166 for new contacts that have not yet been transmitted to an appropriate routing designation and pulls them from the contact database 166. To determine whether the document has been transmitted to particular routing designation, the scheduler may examine a routing log that is included in the contact record for a particular digital document. If the digital document has yet to be transferred to an appropriate routing designation, the scheduler 213 then applies the digital document and the corresponding contact record to a resource manager 216. For example, if a contact record is without a proper routing designation, then the scheduler automatically applies it to the resource manager 216.

The resource manager 216 examines the information contained in the new contact record as well as the resources in terms of agents, etc., that are available to address the particular contact and determines a routing designation for the digital document. The routing designation identifies the agent(s) or other location(s) to which the digital document is to be transmitted. In particular, the resource manager 216 draws an association between the information contained in the fields of the new contact record and similar information known to it, such as a database of potential routing designations, etc. The resource manager 216 may also examine the contact records and digital documents previously received and stored in the contact database 166 and draw an association between the information in the fields of the new contact record and the information contained in the stored contact records, etc. This association is used, for example, to ascertain a proper routine designation or proper agent to whom the digital document should be forwarded. The resource manager 216 also receives status information from the agent's computers 126 informing when an agent is available to receive a digital document to take into account those situations where an agent is on vacation or ceases to be employed by the call center, etc.

To explain further, the resource scheduler 216 may detect that the digital document was received from a customer who had prior dealings with a particular agent. The parser 209 may recognize the customer's name or telephone number noted on a facsimile, for example, and would have placed such information in the appropriate fields of the contact record. The resource manager 216 then draws an association between the new contact record and a prior contact record containing the same telephone number. The resource manager 216 then assigns a routing designation for the new digital document that is the same as the prior digital document.

Once the resource manager 216 has identified a routing designation for a particular contact record, the routing designation is placed in the appropriate field of the contact record. If no routing designation could be ascertained by the resource manager 216, then a routing designation may be assigned to an agent at random or a particular routing designation may be assigned to the contact record that sends the document to appropriate personnel to make a visual determination as to the proper routing designation.

Upon examining the contact record with the new routing designation, the scheduler 213 then transmits the digital document associated with that record to the appropriate computer 126 of specific agent(s) or other destination(s) indicated by the routing designation via the network 126 using, for example, an email routing system. The scheduler 213 then communicates to the contact manager 203 where a particular digital document was transmitted. The contact manager 203, in turn, adds the destination information to the contact record to keep track of who received the particular document and when they received it. This information is important to ensure that digital documents received in the call center are properly acted upon so that a customer is not ignored, thereby discouraging the customer from seeking the assistance of the call center.

In addition, a request for a particular digital document stored on the contact database 166 may be generated by an agent's or manager's computer 126 or 223. This request is forwarded to the contact manager 203. The contact manager 203 notes the request and sets a routing designation in the contact record identifying the requesting party along with a forwarding trigger in the particular contact in question that is detected by the scheduler 213. The scheduler 213 then detects the forwarding trigger and forwards the particular digital document based on the routing designation noted in the contact record. The scheduler 213 then supplies the routing information to the contact manager 203 that notes in the particular contact record where and when the digital document was sent.

An agent's computer 126 also transmits response information to the contact manager 203 when a particular digital document is accessed by the agent, indicating that the underlying customer concern has been addressed. The contact manager 203 notes the response information in the corresponding contact record.

The CCM server 129 also includes a tracking module 219 that allows a user to perform inquiries relating to the various fields of the contact records stored in the contact database 166. Each inquiry includes specific search criteria that are generated by an individual, presumably a manager at the call center, at the manager's computer 223 or other computer 126 linked to the CCM server 129. The search criteria are applied to the tracking module 219 that proceeds to search through the pertinent fields of the contact records on the contact database 166 to find records that match the search criteria. Alternatively, the search criteria may generated and the tracking module 219 may repeatedly perform the search on an automated basis at predetermined times, informing the manager's computer 223 or other individual in the call center 100 when various contact records meet the search criteria as time goes on.

As an example, suppose a manager wishes to find all records received before a specific time that have yet to be responded to by an agent or other appropriate party. The manager creates search criteria that specifies contact records received before a particular date that have yet to have been accessed by the agent to which the digital document was sent. In this manner, the manager can be instantly appraised of how many outstanding digital documents have not been acted upon to ensure that no documents are neglected, etc. Alternatively, the search criteria may be entered and the searches performed automatically at predetermined times, etc.

The contact manager 203, parser 209, scheduler 213, resource manager 216, and the tracking module 219 are each modules or subroutines of the routing/tracking logic 163 that may be implemented in software, hardware, or a combination of both software and hardware.

Figure 4:
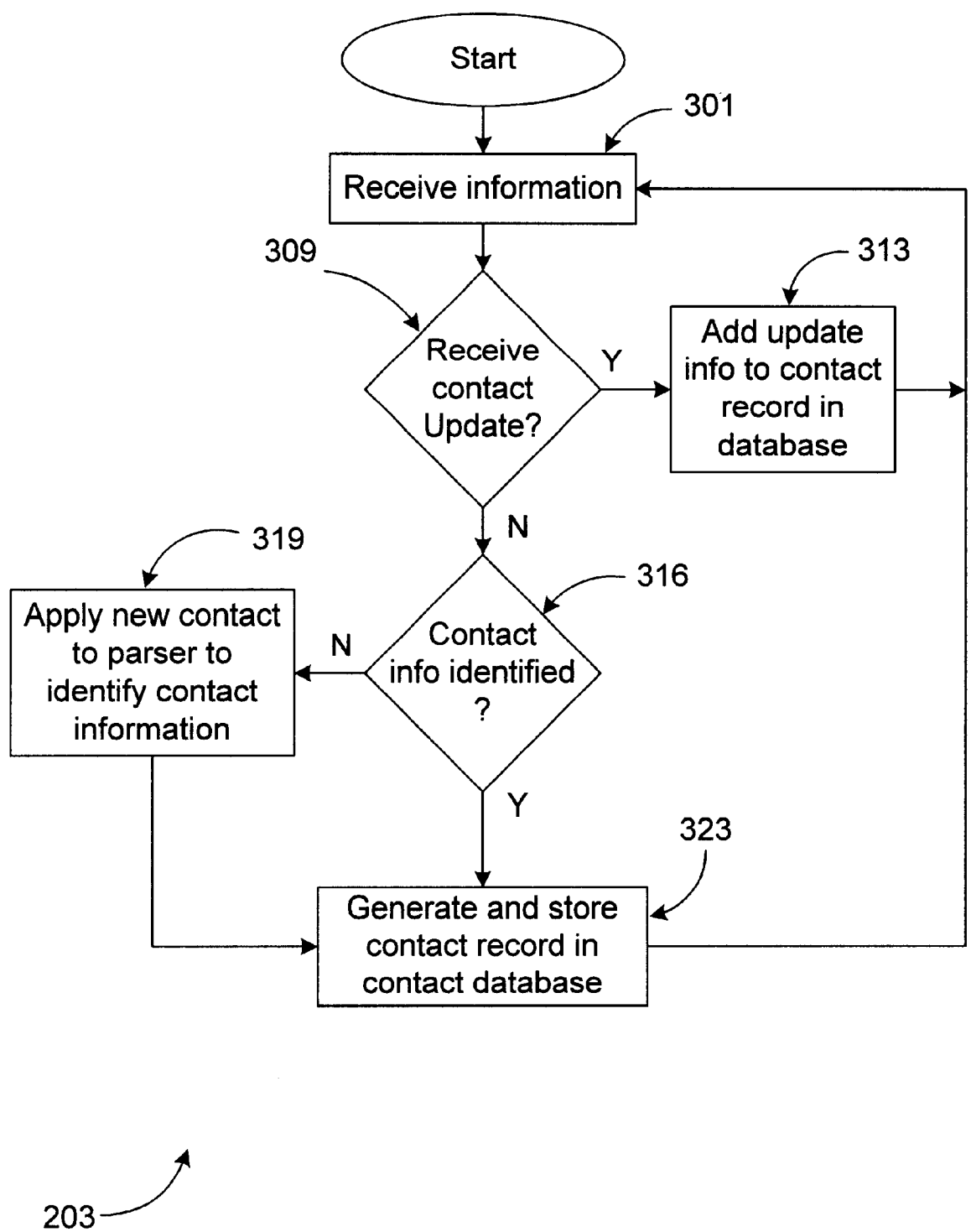
FIG. 4 is a flow chart of a contact manager of FIG. 3.

Turning then, to FIG. 4, shown is a flow chart of the logic of the contact manager 203. The contact manager 203 may be, for example, a subroutine of the routing/tracking logic 163. The flow chart begins with block 301 in which the contact manager 203 receives information that may comprise, for example, a new digital document, an update of an existing contact record, or information from the scheduler 213 (FIG. 3), etc.

The contact manager 203 then proceeds to block 309. In block 309 the contact manager 203 determines whether the information received involves an update of an existing contact record in the contact database 166. Such would be the case, for example, with routing information provided from the scheduler 213 as to where in the network a particular digital document has been distributed or that an agent has accessed a particular digital document transferred to them. If so, then the contact manager 203 proceeds to block 313 where the update information is added to the particular contact record. Thereafter, the contact manager 203 reverts back to block 301.

On the other hand, if in block 309 there is no update information, the contact manager 203 proceeds to block 316. At this point it is assumed that a new digital document has been received by the CCM server 129 (FIG. 3) and the contact manager 203 undertakes the task of creating a corresponding contact record therefor.

In block 316, the contact manager 203 determines whether the information in the digital document is recognizable for specific fields in the corresponding contact record that is created. If not, then the contact manager 203 moves to block 319 in which the digital document is applied to the parser 209 (FIG. 3) that processes the digital document to attempt to identify the desired information as previously discussed. Such may be the case, for example, with digital documents such as facsimiles and scanned documents. Thereafter, the contact manager 203 proceeds to block 323.

If in block 316, the information on the digital document is recognizable, such as a text based document, then the contact manager 203 proceeds to block 323 without applying the document to the parser 209. In block 323, a new contact record is created and the information contained in the digital document is translated into one or more fields of the contact record. This is done, for example, by drawing associations between known information stored in prior contact records in the contact database 166, searching for key words, identifying repeated use of key words, etc. as was discussed with reference to the parser 209. Thereafter, the contact manager 203 reverts back to block 301 to start the process anew.

Figure 5:
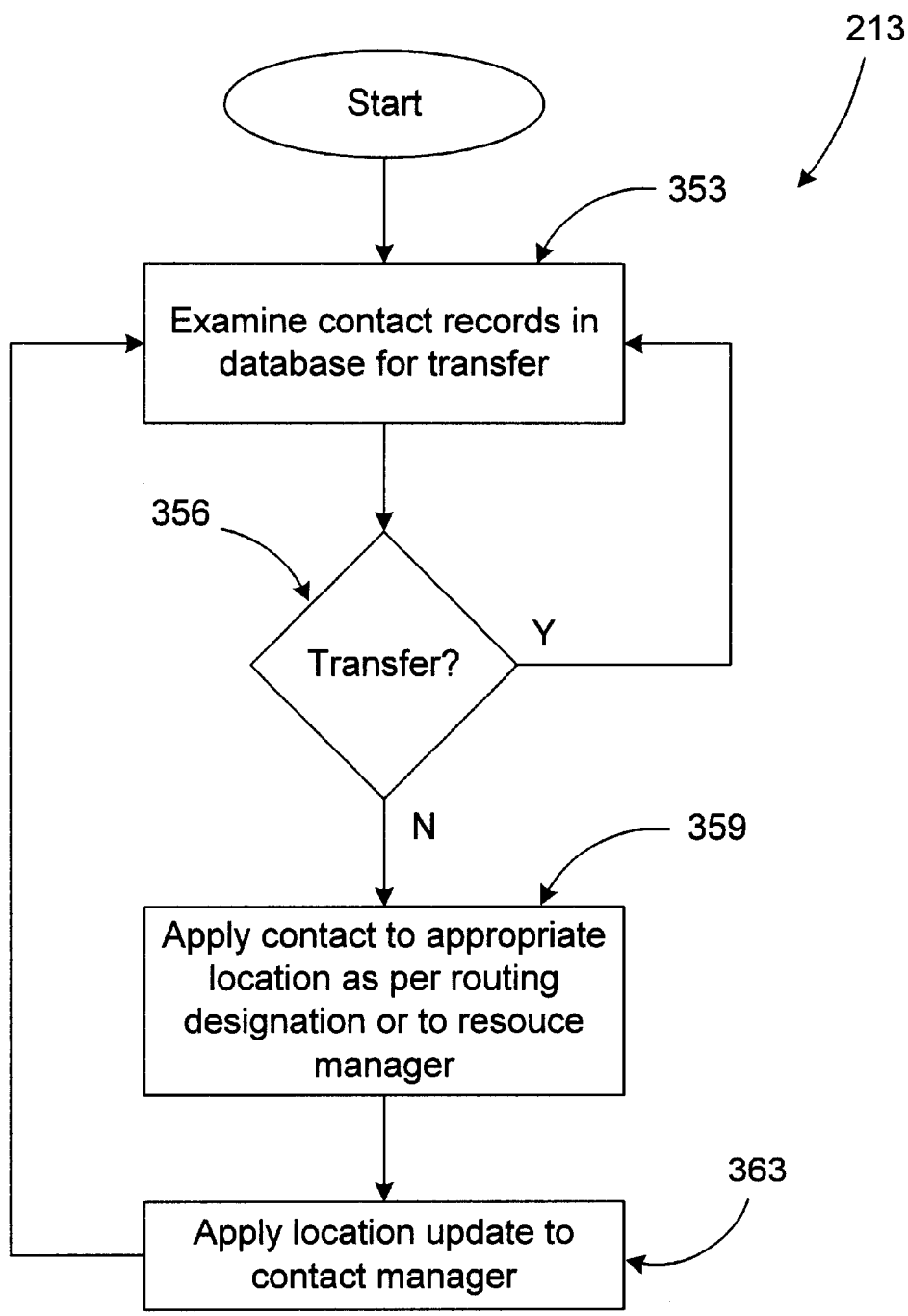
FIG. 5 is a flow chart of a scheduler of FIG. 3.

Turning then to FIG. 5, shown is a flow chart of the logic implemented in the scheduler 213. The scheduler 213 generally serves to distribute the digital document to the proper locations within the network 123 (FIG. 1). Beginning with block 353, the scheduler 213 examines the contact records in the contact database 166 (FIG. 3) for those that indicate that the digital document has not been transferred to an appropriate routing destination. In block 356, if such contacts are found, the scheduler 213 proceeds to block 359, otherwise the scheduler 213 reverts back to block 353.

In block 359, the scheduler 213 distributes a copy of the digital document from the contact database to the particular location in the network 123 based upon the routing destination in the corresponding contact record. If no routing designation is indicated in a particular contact record, the scheduler applies the contact record and associated digital document to the resource manager 216. Thereafter, in block 363 the scheduler 213 sends the location to which the copy of the digital document was distributed, other than to the resource manager 216, to the contact manager 203. The contact manager 203 includes such information in the contact record as discussed with reference to FIG. 4. Thereafter, the scheduler 213 reverts back to block 353 to begin the process anew.

Figure 6:
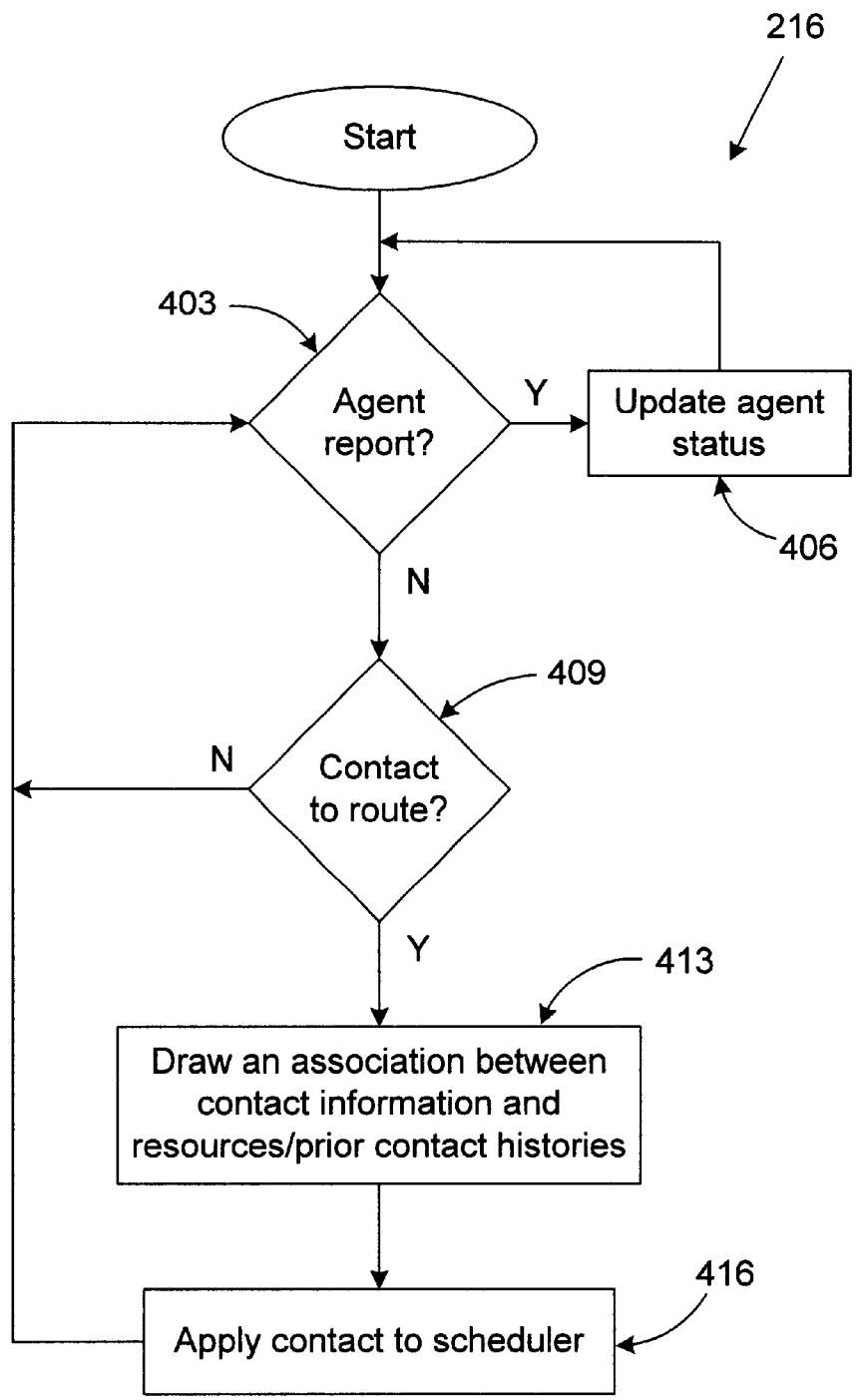
FIG. 6 is a flow chart of a resource manager of FIG. 3.

With reference to FIG. 6, shown is a flow chart of the logic implemented in the resource manager 216. Beginning with block 403, the resource manager 216 detects a status input from the agent computer(s) 126 which informs the resource manager 216 whether the particular agent is available as a resource to receive incoming documents, etc. If such input is received in block 403, then the resource manager 216 moves to block 406 in which the status of the particular agent is updated accordingly. Thereafter, the resource manager 216 reverts back to block 403. In this manner, the resource manager 216 ensures that agents are not sent digital documents at inappropriate times such as when they are off on an extended vacation, etc.

If there is no status input in block 403, then the resource manager 216 proceeds to block 409 in which the resource manager 216 determines if the scheduler 213 (FIG. 3) has applied a digital document to the resource manager 216 to determine a routing designation. If no digital document is so applied, then the resource manager 216 reverts back to block 403. On the other hand, if a digital document is thus applied, the resource manager 216 progresses to block 413.

In block 413, the resource manager 216 attempts to find a routing designation from the information contained in the digital document and prior contacts contained in the contact database 166 as discussed previously. For instance, the resource manager 216 may draw an association between the information contained in the digital document and either available resources such as available agents or information contained in prior contact records stored in the contact database 166. If the routing designation cannot be ascertained by the resource manager 216, then a predetermined routing designation is employed, or determined at random among a number of predetermined destinations. Thereafter, in block 416, the contact record is applied to the scheduler 213 that, in turn, distributes the digital document based upon the determined routing designation.

With reference to FIGS. 3–6, the routing/tracking logic 163 of the present invention described therein can be implemented in hardware, software, firmware, or a combination thereof. In the preferred embodiment(s), the routing/tracking logic 163 is implemented in software or firmware that is stored in a memory and that is executed by a suitable instruction execution system. If implemented in hardware, as in an alternative embodiment, the routing/tracking logic 163 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

In addition, the flow charts and functional block diagrams of FIGS. 3–6 show the architecture, functionality, and operation of a possible software implementation of the present invention. With respect to these software embodiments, each block represents a module, segment, or portion of code, which comprises one or more executable instructions for implementing the specified logical function(s). It should also be noted that in some alternative implementations, the functions noted in the blocks may occur out of the order noted in FIGS. 3–6. For example, two blocks shown in succession in FIGS. 3–6 may in fact be executed substantially concurrently or the blocks may sometimes be executed in the reverse order, depending upon the functionality involved, as will be further clarified hereinbelow.

Also, the software embodiments discussed comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computerreadable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system for tracking and routing a number of digital documents in a call center, comprising:
   a processor coupled to a local interface;
   a memory coupled to the local interface; and
   document tracking logic stored in the memory, the document tracking logic being executed by the processor, the document tracking logic including:
      contact management logic to generate a contact record associated with a digital document and to store the contact record on a contact database;
      resource management logic to identify a routing designation on the digital document, the routing designation indicative of an association between the digital document and digital documents previously received; and
      scheduling logic to transmit the digital document to a destination based upon the routing designation.

2. The system of claim 1, wherein the document tracking logic further comprises parsing logic to identify at least one key word on the digital document to be placed in a field in the contact record.

3. The system of claim 2, wherein the parsing logic further comprises logic to perform a character recognition routine on the digital document.

4. The system of claim 1, wherein the resource management logic further comprises logic to determine the routing designation by forming an association between at least one keyword from the digital document and a number of associative variables stored in the memory.

5. The system of claim 1, wherein the scheduling logic further comprises logic to detect a digital document to be transferred, whereupon the scheduling logic transmits the digital document to a destination.

6. The system of claim 1, wherein the document tracking logic further comprises logic to search the contact database for a contact record that meets a predefined statistical criteria.

7. A system for tracking and routing a number of digital documents in a call center, comprising:
   means for generating a contact record associated with a digital document and to store the contact record on a contact database;
   means for identifying a routing designation on the digital document, the routing designation indicative of an association between the digital document and digital documents previously received; and
   means for transmitting the digital document of a destination based upon the routing designation.

8. The system of claim 7, further comprising means for identifying at least one key word on the digital document to be placed in a field in the contact record.

9. The system of claim 7, wherein the means for identifying at least one key word on the digital document to be placed in a field in the contact record further comprises means for performing a character recognition routine on the digital document.

10. The system of claim 7, wherein the means for identifying a routing designation on the digital document further comprises means for determining the routing designation by forming an association between at least one keyword from the digital document and a number of associative variables stored in the memory.

11. The system of claim 7, further comprising means for searching the contact database for a contact record that meets a predefined statistical criteria.

12. A method for tracking and routing a number of digital documents in a call center, comprising the steps of:
   generating a contact record associated with a digital document and storing the contact record on a contact database;
   identifying a routing designation on the digital document, the routing designation indicative of an association between the digital document and digital documents previously received; and
   transmitting the digital document to a destination based upon the routing designation.

13. The method of claim 12, further comprising the step of identifying at least one key word on the digital document to be placed in a field in the contact record.

14. The method of claim 12, wherein the step of identifying at least one key word on the digital document to be placed in a field in the contact record further comprises the step of performing a character recognition routine on the digital document.

15. The method of claim 12, wherein the step of identifying a routing designation on the digital document further comprises the step of determining the routing designation by forming an association between at least one keyword from the digital document and a number of associative variables stored in the memory.

16. The method of claim 12, further comprising the step of searching the contact database for a contact record that meets a predefined statistical criteria.

17. The system of claim 1 wherein the contact management logic is further operable to determine key field values indicative of a sequence of previously received digital documents and to:
  write an indication of the key field values in the contact record;
  associate the contact record with other contact records having corresponding key field values to identify associations between the contact records; and
  store the digital documents and corresponding contact records in the contact database according to the associations.

18. The system of claim 17 wherein the resource management logic is further operable to determine a routing designation indicative of an agent and to:
  identify, from the key fields, a particular customer corresponding to the current digital document
  determine, from the key fields in the contact records, a sequence of previously received digital documents corresponding to the current digital document; and
  compute, from the associations between the contact records in the sequence, an agent having prior dealings with the particular customer.

19. The system of claim 7 wherein the means for generating a contact record is further operable to determine key field values indicative of a sequence of previously received digital documents and to:
  write an indication of the key field values in the contact record;
  associate the contact record with other contact records having corresponding key field values to identify associations between the contact records; and
  store the digital documents and corresponding contact records in the contact database according to the associations.

20. The system of claim 19 wherein the means for identifying a routing designation is further operable to determine a routing designation indicative of an agent and to:
  identify, from the key fields, a particular customer corresponding to the current digital document
  determine, from the key fields in the contact records, a sequence of previously received digital documents corresponding to the current digital document; and
  compute, from the associations between the contact records in the sequence, an agent having prior dealings with the particular customer.

21. The method of claim 12 wherein the contact management logic is further operable to determine key fields indicative of a sequence of previously received digital documents and generating the contact record further comprises:
  writing an indication of the key field values in the contact record;
  associating the contact record with other contact records having corresponding key field values to compute associations between the contact records; and
  storing the digital documents and corresponding contact records in the contact database according to the associations.

22. The method of claim 21 wherein determining a routing designation further comprises:
  identifying, from the key fields, a particular customer corresponding to the current digital document
  determining, from the key fields in the contact records, a sequence of previously received digital documents corresponding to the current digital document; and
  computing, from the associations between the contact records in the sequence, an agent having prior dealings with the particular customer.

23. A method for routing digital documents in a call center comprising:
  generating, via contact management logic, a contact record including key fields in an incoming digital document, the key fields indicative of a correspondence between the incoming digital document and contact records of digital documents previously received;
  determining, by the matching key fields in the contact records, associations indicative of a document sequence;
  storing the contact records in a contact database according to the associations;
  computing, from the key fields, a document sequence of the incoming digital document and digital documents previously received, the document sequence defined by contact records of prior dealings with a particular customer;
  identifying, via resource management logic, a routing designation indicative of an agent, the routing designation determined by an agent having prior dealings with the particular customer; and
  transmitting, based on scheduling logic, the incoming digital document to the agent identified by the routing designation.

* * * * *